AUTOMATIC GAIN CONTROL SYSTEMS

Filed May 1, 1956 2 Sheets-Sheet 1

INVENTORS
Clyde W. Hoyt
& Lucius P. Thomas, Jr.
BY
ATTORNEY

INVENTORS
Clyde W. Hoyt
& Lucius P. Thomas, Jr.
BY
[signature]
ATTORNEY

United States Patent Office 2,937,235

Patented May 17, 1960

2,937,235

AUTOMATIC GAIN CONTROL SYSTEMS

Clyde Warren Hoyt, Pennsauken, and Lucius Ponder Thomas, Jr., Haddonfield, N.J., assignors to Radio Corporation of America, a corporation of Delaware Application May 1, 1956, Serial No. 581,963

5 Claims. (Cl. 178—7.3)

The present invention relates to improvements in automatic gain control circuits for television receivers.

It is common practice in the design and construction of television receivers to provide an automatic gain control circuit which controls the gain of the overall receiver as an inverse function of received signal strength. By this means, receiver performance and picture quality are rendered more immune to changes in received signal strength. This automatic gain control function is generally accomplished by developing a control voltage which is a function of received signal strength. The control voltage, frequently referred to as an automatic gain control voltage, is applied to one or more amplifiers handling received television signals in a manner which acts to decrease the gain of the receiver as the received signal strength increases.

It has been proposed, as one means for developing the required automatic gain control voltage, to employ the average direct current flow through the television receiver second detector. The magnitude of the direct current flow through second detector is, of course, a function of both the received signal intensity as well as the brightness or D.-C. component of the television scene to be reproduced. According to the United States standards, a decrease in scene brightness will produce a decrease in average current flow through the second detector of a television receiver in the same manner as a reduction in the received signal intensity. To correct this, it has also been proposed to subtractively combine with the voltage derived from the second detector current flow, a voltage which represents only the scene brightness or D.-C. picture component of the television signal. Under certain conditions, the resulting voltage represents only variations in the intensity, or peak to peak amplitude, of the received television radio carrier and is suitable for automatic gain control purposes.

One convenient way of developing a correction signal which represents only scene brightness, is to sample the potential of a conventional synchronizing signal separator stage in which the grid-cathode current flow is depended upon to self bias the separator stage and establish the separating threshold. However, if the synchronizing signal separating stage is positioned in the receiver circuit at a point following the manual contrast control of the receiver, the correction voltage relied upon to cancel the scene component from the average signal derived from the second detector, will vary as a function of contrast control setting. This will produce undesired variations in the automatic gain control voltage in the receiver and may result in either a reduction in signal to noise ratio or an overload condition in the receiver.

The present invention overcomes the above disadvantage by providing means for controlling the nominal direct current value of the developed automatic gain control potential as a function of the manual contrast control setting in a television receiver in such a way that undesired changes in automatic gain control voltage, otherwise due to manual contrast control settings, will be minimized.

In one form of the present invention applied to a television receiver of the type described, the actual voltage used for automatic gain control purposes is made up of what may be termed three distinct indicating potentials. The first represents the direct current value of the rectified or demodulated carrier. The second represents the brightness component of the video signal being received. The third depicts the relative setting of the manual contrast control in the receiver. These three potentials are so combined to provide a voltage which varies in magnitude substantially only in response to variations in the intensity of the received radio television carrier and as such is suitable for use as an automatic gain control potential.

A better understanding of the present invention will be obtained by reference to the following specification, especially when considered in connection with the accompanying drawings, in which.

Figures 1, 2:
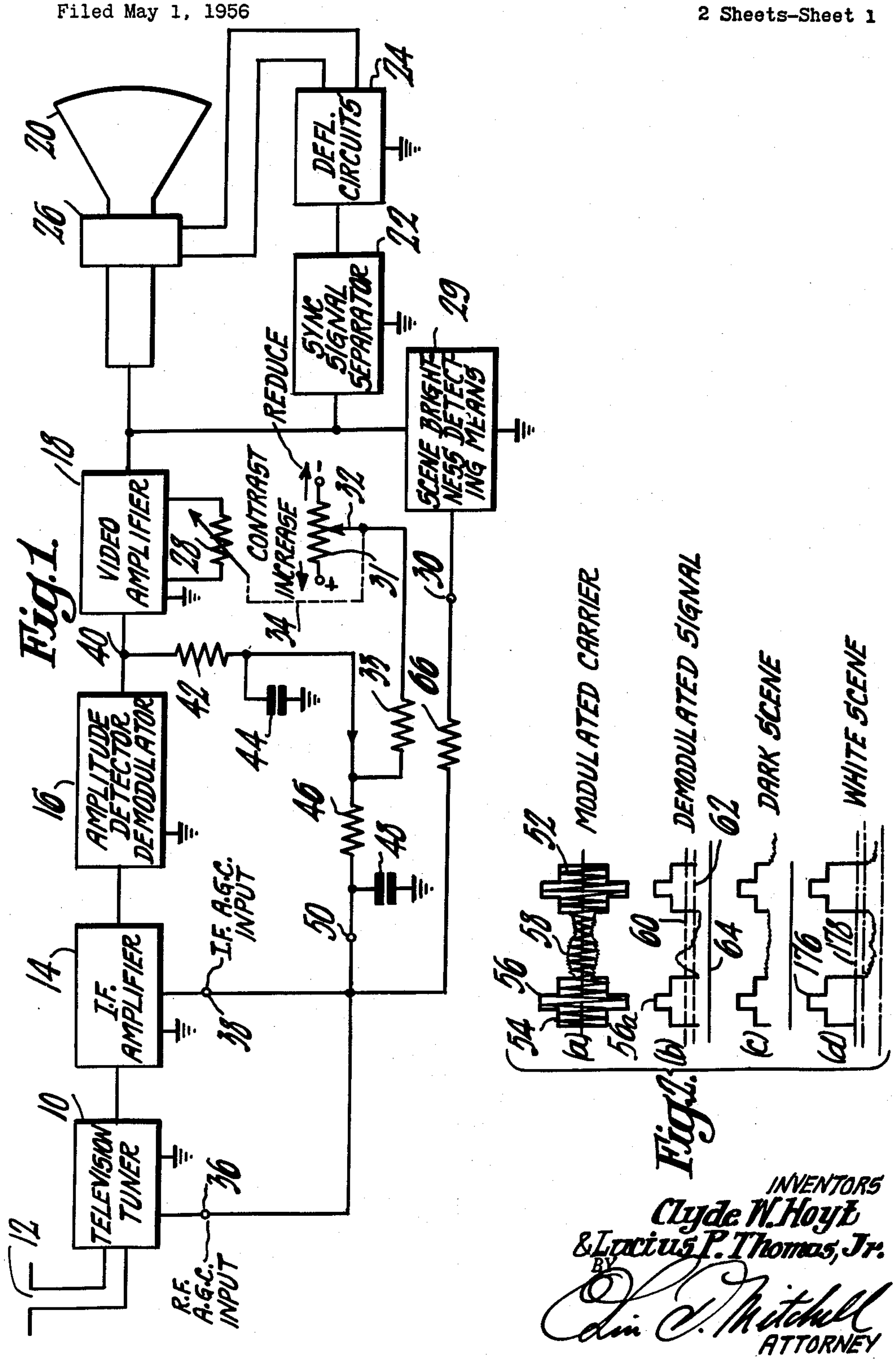
Figure 1 is a block diagram representation of one form of the present invention when embodied in a television receiver.
Figure 2 is a graphical representation of certain electrical waveforms typically encountered in the practice of the present invention.

Turning now to Figure 1, there is shown at 10 a conventional television tuner operatively connected with a receiving antenna 12. Output signal from the television tuner is conventionally applied to an intermediate frequency amplifier 14 which is in turn operatively coupled to a conventional amplitude detector demodulator 16. Demodulated video signal appearing at the output of the detector 16 is in turn applied to the video amplifier 18 which is connected for driving the kinescope 20. The amplified demodulated video signal appearing at the output of the amplifier 18 is also applied to a conventional synchronizing signal separator circuit 22. The output of separator circuit 22 is applied for controlling the timing of deflection circuits 24 operatively connected with the deflection yoke 26 surrounding kinescope 20.

The video amplifier 18 is supplied with a contrast control 28 which purely by way of example has been indicated as a variable resistive element. For purposes of understanding the present invention, the contrast control 28 may be thought of as any means for controlling the gain of video amplifier 18 so that the amplitude of the signal applied to the kinescope 20 will be suitably controlled.

In accordance with prior art practice, scene brightness detecting means 29 is operatively coupled with the output of the video amplifier 18 to develop a signal at terminal 30 which is a function of the brightness component (or D.-C. picture information) in the received television signal. The scene brightness detecting means 29 may be nothing more than a D.-C. restorer circuit means well known in the art. Other block elements described thus far in connection with Figure 1 are also well known in the art.

In more particularity, it will be seen that the television tuner 10 and the intermediate frequency amplifier 14 have been provided with respective automatic gain control voltage input terminals 36 and 38 respectively. For purposes of understanding this embodiment of the present invention, it will be assumed that the automatic gain control voltage to be applied to terminals 36 and 38 is conventionally negative with respect to circuit ground and that it becomes more negative as signal intensity increases.

The automatic gain control voltage developed for this purpose is primarily dependent on the average output potential of the amplitude detector demodulator 16. As well known in the art, the average output voltage of an amplitude detector used in demodulating amplitude modulated radio carriers, is a direct function of the intensity of the received signal. If the polarity of signal demodulation provided by the detector 16 is such that the potential at the output terminal 40 is generally negative with respect to circuit ground, the potential at 40 may be filtered via the resistor 42 and the capacitor 44 taken in combination with resistor 46 and capacitor 48 to provide a voltage at terminal 50 which represents the average potential at terminal 40.

The character of the signal applied to the input of the amplitude detector demodulator 16 is, by way of example, illustrated in Figure 2*a*. Figure 2*a* shows a carrier signal 52 amplitude modulated by a video signal envelope. The envelope comprises a blanking component 54, a synchronizing component 56 and a video component 58. In the particular arrangement shown, the signal at the output of the detector demodulator 16 will be substantially of the form shown in Figure 2*b* but of opposite polarity. That is, the demodulated synchronizing component **56*a* will actually extend in a negative going direction. The dotted line 60 illustrates the A.-C. axis of the video signal envelope whereas the dotted line 62 depicts the average D.-C. value of the potential at terminal 40. The line 64 represents circuit ground or zero volts as an arbitrary reference. Should the received signal intensity become greater, the average negative potential at terminal 40 will increase. The average negative potential at terminal 40** will also increase if the brightness component of the received television signal decreases as in the case of a darker picture. A demodulated video signal representing a darker picture is shown in Figure 2*c*. Contrariwise, should the received picture information correspond to a whiter scene, the waveform in Figure 2*d* is representative. Thus, under the conditions of a white scene, the average potential at terminal 40 will become less negative. It, therefore, appears that the potential at terminal 50, which is a filtered version of the potential at terminal 40, does not by itself constitute a desirable automatic gain control voltage. This is because either an increase in signal strength or a decrease in scene brightness will produce a reduction in the gain of the television receiver.

In accordance with prior art arrangements, a scene brightness detecting means 29 may be connected with the output of the video amplifier 18 to develop a voltage at terminal 30 which becomes more negative as the television scene becomes whiter and contrariwise, more positive (less negative) as the scene becomes darker. This statement is, of course, predicated upon the delivery to the detecting means 29 of a video signal which does not, because of automatic gain control action, change appreciably in peak to peak value as a function of changes in the received signal strength. If, then, the output voltage of terminal 30 is mixed through resistor 66 with the output voltage at terminal 50 in the proper proportions, the scene component of the received television signal can be combined in an out-of-phase sense with the voltage at terminal 50 so that the resulting automatic gain control potential is representative only of changes in the relative strength of the received radio television carrier.

The voltage mixing arrangement just described in connection with Figure 1 is adequate to provide a useful automatic gain control voltage at terminal 50 for a given setting of the contrast control 28 of the video amplifier 18. If, however, the television receiver operator reduces the gain of the video amplifier 18 in order to reduce the contrast of the scene produced on the kinescope 20, the peak-to-peak amplitude of signal applied to the brightness detecting means 29 will be reduced. This will produce at terminal 30 a potential change in the direction corresponding to the reception of a whiter picture. The potential at terminal 30, under the assumed conditions described, will then become less negative. This will allow the potential at terminal 50 to become less negative and the receiver gain will be undesirably increased.

To correct for this undesirable change in receiver gain in accordance with the present invention, means 31 is provided for developing an indicating voltage which represents the gain control setting of the contrast control 28. By way of example, means 31 has been shown as a resistor having a movable tap 32 mechanically coupled (as indicated by dotted line 34) to the controlling element of the contrast control 28. The tap 32 is connected through resistor 33 to resistor 46.

In the operation of the present invention, it will be seen that as the contrast control 28 is adjusted to reduce the gain of the video amplifier 18, potential available at terminal 32 is caused to become more negative. This assumes that the arm 32 on the potentiometer 31 will be moved to the right (in the drawings) as the contrast control 28 is adjusted to reduce the gain of the video amplifier 18. In accordance with the present invention, this increase in the negative indicating voltage at the arm 32 attending a manually imposed reduction in the gain of the video ampliger 18, is caused to produce a sufficient negative increase of the potential at terminal 50 to correct for the undesired positive swing of the potential at terminal 50 due to the reduced amplitude of signal delivered to the scene brightness detecting means 29. In this manner, the net automatic gain control potential appearing at terminal 50 will be rendered independent of contrast control adjustment.

In the arrangement just described, it may be helpful to consider that the desired correcting action of the present invention involves the careful combining of three separate potentials, each of which may be thought of as an indicating potential. The first indicating potential is the average direct current component of the signal delivered by the detector 16. The second indicating potential, the direct current potential developed by the scene brightness detecting means 29 and the third indicating potential is the voltage developed at tap 32 of the potentiometer 31. The three potentials are combined to form a net potential suitable for use as an automatic gain control voltage for the amplifiers 10 and 14.

Figure 3:
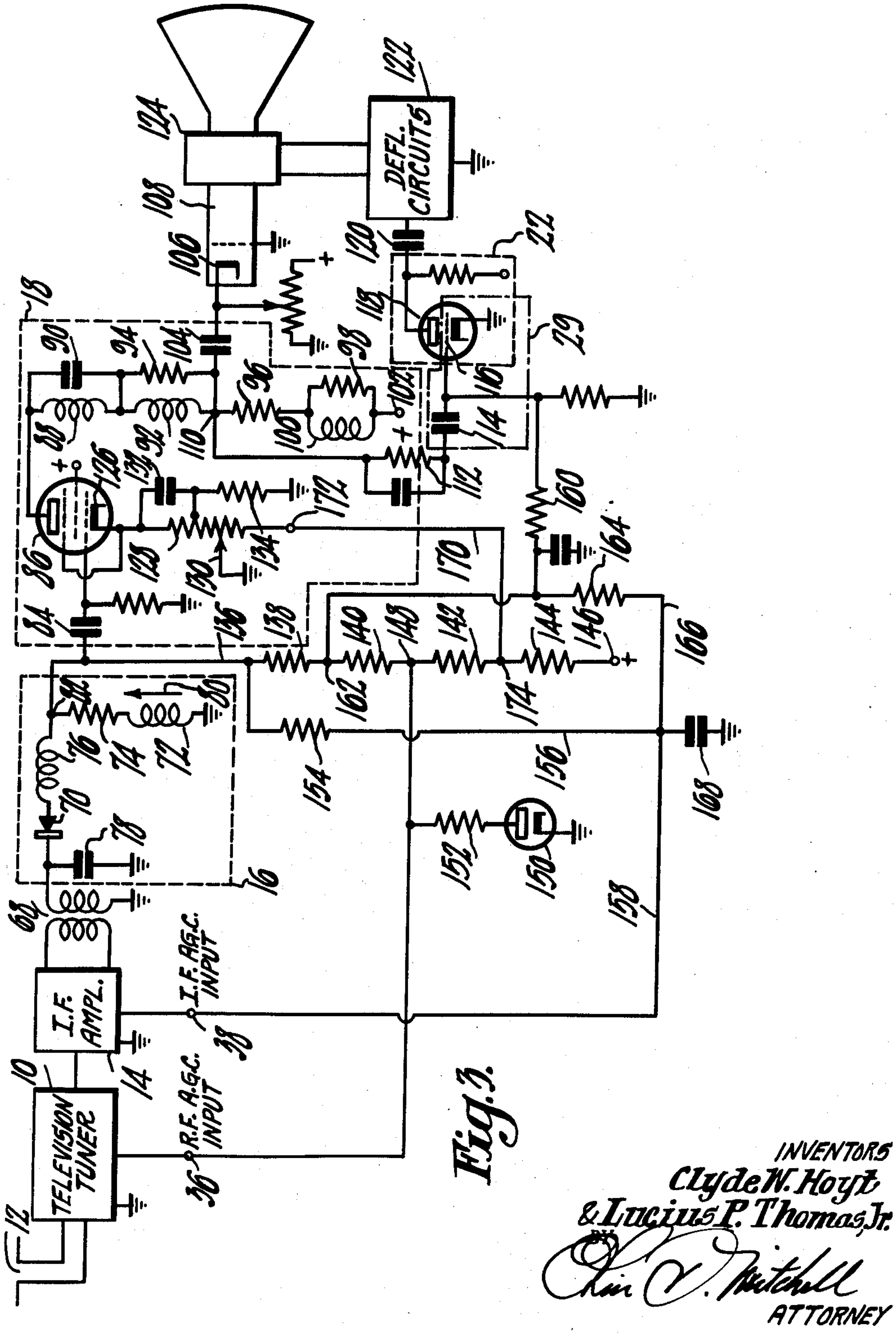
Figure 3 is a combination block and schematic representation showing another form of the present invention as it may be practiced in a television receiver.

In Figure 3, the operation of the present invention may be more clearly understood in connection with a particular circuit following out the concepts of the present invention as discussed in connection with Figure 1. Turning now to the arrangement of Figure 3, a television tuner 10, antenna 12 and intermediate frequency amplifier 14 having automatic gain control voltage input terminals 36 and 38 are shown. These are substantially identical to the corresponding elements of Figure 1. Circuitry within the dotted line areas of Figure 3 corresponds to forms of circuitry suitable for use in the correspondingly numbered solid line blocks of Figure 1. In Figure 3, however, output signal from the intermediate frequency amplifier 14 is specifically shown to be inductively coupled via the transformer 68 to a diode amplitude detector demodulator based upon the diode 70. A demodulator load circuit for the diode 70 is shown comprising inductor 72, resistor 74, inductor 76 and capaictor 78. The direction of classical electric current flow through the demodulator load circuit is shown by the arrow 80. This, of course, is opposite to the direction of actual electron current flow. Demodulated video signals are extracted from the load circuit at terminal 82 and capacitively coupled by a capacitor 84 to the control electrode of the video amplifier tube 86. The anode of the video amplifier tube 86 is conventionally coupled to an output load circuit comprising the inductor 88, capacitor 90, inductor 92, resistor 94, resistor 96, resistor 98 and inductor 100. The lower extremities of resistor 98 and inductor 100 are connected to a source of polarizing potential for the anode of the video amplifier 86. This source of potential has not been shown and is provided with a positive terminal shown at 102 and a negative terminal (not shown) which is connected with circuit ground. Amplified video signal from the amplifier 86 is capacitively coupled via capacitor 104 to the cathode 106 of a kinescope shown in part at 108. The video signal for the kinescope 108 is extracted from the load circuit at point 110 therein. Video signal appearing at the point 110 is also coupled through the time constant circuit 112 and capacitor 114 to the control electrode 116 of a sync separator tube 118. Output signal from the sync separator 118 is capacitively coupled through capacitor 120 to conventional television deflection circuits indicated by the box 122. Developed deflection signals are shown connected to the deflection yoke 124 associated with the kinescope 108.

The cathode 126 of the video amplifier 86 is shown connected to a tapped potentiometer 128 having a movable tap 130. Frequency compensating network means comprising capacitor 132 and resistor 134 are connected with the potentiometer 128 as shown. As hereinafter described, the potentiometer 128 acts in part as a manually adjustable contrast control for the receiver corresponding to element 28 of Figure 1.

The average D.-C. potential appearing at point 82 in the diode detector circuit is communicated via lead 136 to a voltage divider comprising resistance elements 138, 140, 142 and 144 to a source of ground referenced potential (not shown) having a positive terminal at 146. Automatic gain control voltage for the RF portion of the tuner 10 is extracted from the bleeder network at terminal 148. A diode 150 is connected from terminal 148 to circuit ground through a resistor 152. The diode 150 acts as a conventional clamping means to prevent the automatic gain control potential applied to the RF portion of the television tuner from ever becoming positive with respect to circuit ground. From point 82 in the diode load circuit and specifically from the upper extremity of resistor 138, a resistor 154 is connected through lead 156 and lead 158 to AGC terminal 38 of the intermediate frequency amplifier 14. By this means, automatic gain control voltage is applied to terminal 38 of the intermediate frequency amplifier 14.

As will be explained in more detail hereinafter, a resistor 160 is connected from the control electrode 116 of the synchronizing signal separating tube 118 to point 162 of the resistive bleeder circuit previously described. Also from the left hand extremity of the resistor 160, a resistor 164 is connected via leads 166 and 158 to terminal 38 of the intermediate frequency amplifier 14. A capacitor 168 is connected from the bottommost extremity of resistor 164 to circuit ground to define at least in part the time constant characteristic of the automatic gain control circuit.

It will also be noted that, in accordance with the present invention, a connection 170 is made from terminal 172 of potentiometer 128 to the junction 174 between resistors 142 and 144.

In considering the operation of the embodiment shown in Figure 3, it will be helpful to refer back to the arrangement of Figure 1. It will be seen that the diode 70 and its associated load circuit (Figure 3) is equivalent to the amplitude detector demodulator 16 (Figure 1). Likewise, the video amplifier 86 (Figure 3) corresponds to the video amplifier 18 (Figure 1). The potentiometer 128 (Figure 3) corresponds to the contrast control 28 (Figure 1). Kinescope 108 (Figure 3) corresponds to the kinescope 20 (Figure 1). The bleeder resistors 138, 140, 142 etc. (Figure 3) correspond in function to resistors 42, 46 and 33 (Figure 1). The function of potentiometer 31 (Figure 1) will be seen to be provided in Figure 3 by a voltage dividing action taken in connection with tapped resistor 128 of Figure 3. The scene brightness detecting means of Figure 1 is shown in Figure 3 as constituted by a self biasing feature of the synchronizing signal separator 118 which also performs the function of the septrator 22 in Figure 1. Deflection circuits 122 in Figure 3 correspond to the deflection circuits 24 in Figure 1.

Considering the operation of Figure 3 in more detail, received television signals produce a current flow through the diode load circuit associated with diode 70 in the direction of the arrow 80. Consequently, the terminal 82 will tend to become negative with respect to circuit ground in response to an increase in received signal intensity. However, as previously considered in connection with Figures 1 and 2, should, for a given intensity of received radio carrier, the picture content of the transmitted picture become darker, the average negative potential at terminal 82 will increase. Since the RF and IF automatic gain control terminals 36 and 38 are communicated to terminal 82 through the resistor network 138, 140, 142, 144 and 154, it will be seen that the gain of the receiver would normally tend to be reduced both for an increase in received carrier intensity (as is desirable) and a decrease in the brightness in the picture being transmitted (as is undesirable). In accordance with the general principles understood in the prior art, this undesirable change in the automatic gain control voltage due to picture brightness information is corrected by mixing a voltage derived from the control electrode of the sync separator tube 118 with the voltage developed at terminal 82 of the detector. The voltage at the control electrode 116 of the sync separator tube 118 is negative with respect to circuit ground. This is due to grid-cathode conduction in the sync septrator tube produced by the positive going synchronizing pulse component of the video signal appearing at terminal 110. The magnitude of the voltage at the control electrode 116 will, assuming a constant amplitude of received signal carrier to the detector 70, be a sole function of the brightness component in the received television signal. Referring back to Figure 2*d* for example, the negative voltage developed on the control electrode 116 will be directly proportional to the potential difference between the peak of the synchronizing pulse 176 and the alternating current axis 178 of the video component. Should the scene content become darker, the character of the signal applied to the control electrode 116 will appear more like that shown in Figure 2*c*. Consequently, the negative voltage at terminal 116 will decrease for a darker picture and increase for a bright picture. This general response is opposite to the above described undesired change in the potential of the detector terminal 82. Thus, by communicating the negative potential at terminal 116 through resistor 160 to terminal 162 on the resistor network, the voltage at terminal 148 may be made substantially independent of scene brightness content. Likewise, resistor 164 can communicate a corresponding potential to terminal 38 so that the potential at this point will be independent of scene brightness.

With the above arrangement, it will be understood that the automatic gain control potential developed at terminals 36 and 38 of the RF and IF amplifiers can be made independent of scene brightness by properly balancing resistance values in the circuit. This assumes, of course, a fixed gain between the detector circuit and the input circuit of the synchronizing separator 118. However, it is common practice to include gain control means for the video amplifier 86 such as the potentiometer 128 above described. If the tap 130 on potentiometer 128 were moved in an upward direction (in the drawing) so as to reduce degeneration in the amplifier 86, the contrast of the reproduced picture will increase and the peak to peak amplitude of signal applied to the synchronizing signal separator tube 118 will increase. Thus, the negative voltage at the control eelctrode 116 will tend to increase, resulting in an undesired negative swing in the automatic gain control voltage applied to the RF and IF amplifiers.

In accordance with the present invention, this undesired change in automatic gain control voltage due to manual adjustment of the tap 130 on the resistor 128 is compensated by the connection 170 between point 172 on the potentiometer 128 and point 174 in the resistor network. With the connection 170 as shown, a bleeder network will be established from the positive potential terminal 146 through resistor 144 and the bottom portion of the potentiometer 128. As the movable tap 130 is moved to reduce degeneration in and increase the gain of the amplifier 86, the potential at terminal 174 will be caused to become more positive. By properly balancing the resistance values of the element shown, this positive increase in the potential at terminal 174 can be such to correct for the increase in negative potential provided by the sync separator grid 116—attributable to the increased gain of and greater amplitude signal delivered by the amplifier 86.

Purely by way of example of one set of resistance values which will provide the desired correcting action in the arrangement of Figure 3 is submitted as follows. The numbers following the resistor symbol R correspond to the numbered elements in the drawing and described above.

R74=3900 ohms
R128=3000 ohms
R138=220,000 ohms
R140=82,000 ohms
R142=820,000 ohms
R144=68,000 ohms
R154=680,000 ohms
R160=2.2 megohms
R164=1.2 megohms

Having thus described the invention, what is claimed is:

1. In a television receiver for receiving, demodulating and transducing a standard television radio carrier into a visible television image, said television carrier being modulated with a video signal having an average brightness component which defines the overall brightness of the television picture to be reproduced, variations in brightness in the television image to be reproduced being defined by changes in the average value of received carrier intensity, the combination of: automatic gain control means included in said receiver for varying the overall gain of said receiver as a function of radio carrier intensity, said automatic gain control means being responsive to an automatic gain control voltage; a demodulator circuit operatively coupled in said receiver to demodulate a television radio carrier signal into a video signal having a direct current potential component and an alternating current wave component, the magnitude of said direct current potential component being representative of both the desired scene brightness as well as the intensity of the received radio carrier; means coupled with said demodulator circuit for developing a first indicating potential in response to the direct current component of said video signal as provided by said demodulator circuit; a video signal amplifier means operatively coupled with said demodulator for accepting and amplifying at least the alternating current component of said demodulated video signal; a peak detecting means alternating current coupled with said demodulating means through said amplifier means for developing a second direct current indicating potential which for a given signal intensity varies substantially only with picture brightness information; manual gain control means operatively connected with said amplifier such that the amplitude of signal applied to said detecting means may be manually adjusted; voltage developing means including a direct current source operatively coupled with said gain control means for developing a third direct current indicating potential representing the manual gain control setting of said gain control means; means operatively combining said first, second and third indicating potentials to produce a net voltage whose value is substantially independent of the setting of said manual gain control means and otherwise represents substantially only the intensity of received radio carrier; and means applying said net voltage to said automatic gain control means as an automatic gain control voltage therefor.

2. In a television receiving system for transducing standard radio television signals into a visible television image, said radio signals comprising a carrier amplitude modulated with a complex television signal including a synchronizing component, a blanking component and a video component, the signal level difference between the alternating current axis of said complex signal and the peak of either said blanking component or said synchronizing component substantially depicting the average brightness of the television scene represented by said complex signals, the combination of: means connected in said receiver for rectifying received carrier signals amplitude modulated by said complex television signal to produce demodulated video signals having a direct current component and an alternating current component, the value of said direct current component representing both the strength of said carrier as applied to said rectifying means the average brightness of the television scene represented by said complex television signal; controllable gain amplifying means operatively connected with said rectifying means for driving said rectifier with received television carrier signals, said amplifying means having at least one gain control terminal for accepting control potential for controlling the gain of said amplifying means; means operatively applying the direct current potential component of said demodulated television signal to said amplifying means gain control terminal with such electrical sense as to decrease the gain of said amplifying means in response to both an increase in the intensity of received television carrier signal and a decrease in the average brightness of said television scene; video signal amplifying means operatively coupled with said rectifying means for amplifying said demodulated video signals; manual gain control means operatively connected with said video signal amplifying means to control the peak to peak amplitude of the video signal delivered by said video signal amplifying means; rectifying means alternating current coupled with said video signal amplifying means to develop a first direct current indicating potential, the value of which is a function of both the peak to peak amplitude of said amplified video signals and the average brightness of said television scene; means operatively combining said first direct current indicating potential with the potential applied to said gain control terminal in such electrical relation thereto as to produce a resultant potential at said gain control terminal in which variations attributable to changes in the average brightness component of said television scene are reduced; means operatively coupled with said manual gain control means to develop a second direct current indicating potential representing the gain setting of said manual gain control means; and means operatively combining said second direct current indicating potential with the resultant potential appearing at said gain control terminal with such electrical sense as to render the gain control of said controllable gain amplifier substantially free of influence by changes in the setting of said manual gain control means.

3. In a television superheterodyne type receiving system for transducing standard radio television signals into a visible television image, said radio signals comprising a radio carrier amplitude modulated with a complex television signal including a synchronizing pulse component, blanking component and a video component, the signal level difference between the alternating current axis of said complex signal and the peak of either said blanking component or said synchronizing pulse component substantially depicting the average brightness of the television scene represented by said complex signal, the combination of: means converting received radio television signals into corresponding superheterodyne intermediate frequency signals; intermediate frequency amplifier means operatively coupled with said converting means for amplifying said intermediate frequency signals; gain control means operatively included in said intermediate frequency amplifier means for controlling the gain of said intermediate frequency amplifier means as a function of an applied gain control potential, said gain control means having a terminal for accepting said control potential for controlling the gain of said amplifier means; means coupled with said intermediate frequency amplifier means for demodulating amplified intermediate frequency signals to produce a video signal having a direct current potential component and an alternating current potential component, the value of said direct current component representing both the strength of the carrier signal applied to said receiver and the average brightness of the television scene depicted by the complex television signal modulating said radio carrier; direct current signal transducing means operatively coupled between said demodulating means and the gain control terminal of said gain control means for applying to said gain control terminal the direct current potential component of said demodulated intermediate frequency signal with such an electrical sense that an increase in the intensity of the received radio carrier signals will produce a reduction in the gain of said intermediate frequency amplifier to a degree tending to maintain the amplitude of intermediate frequency signal to said demodulating means substantially constant over a wide range of radio carrier signal intensities, the gain of said amplifier means being likewise undesirably reduced in response to a decrease in the average brightness of the television scene depicted by said complex television signal; image reproducing means for accepting a video signal and transducing said video signal into a visible television image; means operatively coupling said video amplifier between said demodulating means and said image producing means for driving said image producing means with amplified video signal; manual gain control means operatively connected with said video amplifier means for controlling the amplitude of signals applied to said image producing means; rectifying means for accepting an alternating current signal and producing a direct current indicating potential representing amplitude of applied signal as well as the difference in level between the peak amplitude of said signal and the alternating current axis thereof; alternating current coupling means connected from said video amplifier to said rectifying means for rectifying amplified video signal to develop a first direct current indicating potential representing both the amplitude of video signal coupled thereto and the average brightness of the television scene to be produced; direct current signal transducing means operatively applying said first indicating potential to said gain control terminal with such an electrical sense that decrease in the average brightness of the television scene tends to increase the gain of said intermediate frequency amplifier; means operatively coupled with said manual gain control means for producing a second direct current indicating potential representing the gain control setting of said manual gain control means; and direct current signal transducing means operatively coupling said second indicating potential to said gain control terminal with such an electrical sense as to decrease the gain of said intermediate frequency amplifier in response to a manual increase in the gain of said video amplifier.

4. In a television receiving system for transducing standard radio television signals into a visible television image, said radio signals comprising a carrier amplitude modulated with a complex television signal including a synchronizing component, a blanking component and a video component, the signal level difference between the alternating current axis of said complex signal and the peak of either said blanking component or said synchronizing component substantially depicting the average brightness of the television scene represented by said complex signals, the combination of: means providing a circuit ground against which signals as hereinafter defined may be electrically referenced; means connected in said receiver for demodulating received television radio carrier signals to produce a video signal so polarized that said synchronizing component thereof extends in a negative direction with respect to said circuit ground, said demodulated video signal having a direct current component representing both the strength of the received radio carrier and the average brightness of the television scene represented by the received television sginal; controllable gain amplifying means operatively connected with said demodulating means for driving said demodulating means with received television carrier signals, said amplifying means having at least one gain control terminal for accepting a gain control potential negatively polarized with respect to said circuit ground for the purpose of controlling the gain of said amplifying means; means operatively connected with said demodulating means for developing a first indicating potential negative with respect to said circuit ground, the magnitude of which is a function of the direct current component of said demodulated video signal such that the negative value of said first indicating potential increases in response to both an increase in the intensity of received television carrier signals and a decrease in the average brightness of a television scene represented by said video signal; a video signal amplifier comprising a vacuum tube having at least an anode, cathode and control electrode; an input circuit coupled between said control electrode and cathode; a capacitor operatively coupled between said demodulator means and said control electrode for driving said control electrode with video signal; a source of positive potential referenced to said circuit ground; a first resistor connected from said cathode to said source of positive potential; a movable tap operatively associated with said first resistor and direct current connected with said circuit ground so that the value of resistance between said cathode and circuit ground may be manually varied; output circuit means including anode polarizing means connected between said anode and circuit ground for developing an amplified video signal having the synchronizing component thereof extending in a positive direction with respect to circuit ground; a synchronizing signal separator tube having at least anode, cathode and control electrode; means direct current coupling said separator tube cathode with circuit ground; output circuit means operatively connected between said separator tube anode and circuit ground; a capacitor operatively connected between said video amplifier tube output circuit and said separator tube control electrode for driving said control electrode positive with respect to said separator tube cathode during synchronizing pulse components; a second resistor connected from said separator tube control electrode and circuit ground to form a time constant charging network with said capacitor whereby a negative voltage is developed at said separator tube control electrode depicting the brightness component of received television signals; a third resistor connected from said separator tube control electrode to said gain control terminal for combining the negative voltage developed at said separator tube control electrode with the voltage appearing at said gain control terminal; a fourth resistor connected in series with said source of positive potential and said first resistor to produce a voltage drop across said first resistor which is a function of the manual positioning of said movable tap; a fifth resistor connected between said fourth resistor and said gain control terminal such that the voltage appearing at said gain control terminal is a function of the manual positioning of said movable tap on said first resistor; and separate means operatively connected with the output circuits of both said video amplifier tube and said separator tube for utilizing the signals delivered thereby to produce a visible television image.

5. In a television receiver, the combination of: a controllable gain signal amplifier for amplifying received television signals prior to demodulation, said controllable gain amplifier having a gain control terminal; a signal demodulator circuit operatively coupled with said amplifying means to develop a video signal; a video amplifier operatively coupled with said demodulator means for amplifying demodulated video signals; a synchronizing signal separating circuit operatively connected with the output of said video amplifier for accepting amplified video signals extending in a positive going polarity direction; means included in said synchronizing signal separator circuit for developing a negative voltage, the amplitude of which is a positive function of scene brightness; means operatively applying said developed negative voltage to said amplifying means gain control terminal; manual gain control means operatively connected with said video amplifier for controlling the amplitude of signal applied to said synchronizing signal separating circuit; means operatively coupled with said manual gain control means for developing a potential which is a functon of the manual setting of said manual gain control means and resistance means operatively connected from said last named means to said gain control terminal for combining said last named potential with the potential developed by said synchronizing signal separator in such an electrical sense that the potential appearing at said gain control terminal is substantially independent of the manual gain control setting of said manual gain control means.

References Cited in the file of this patent

UNITED STATES PATENTS

| | | |
|---|---|---|
| 2,230,295 | Holmes | Feb. 4, 1941 |
| 2,606,247 | Fyler | Aug. 5, 1952 |
| 2,635,184 | Cotsworth | Apr. 14, 1953 |

OTHER REFERENCES

Riders Television Manual, vol. 5, copyrighted 1950, Philco TV, pages 5–23, Philco Model 50–T–1600, Code 121.